(12) United States Patent
Campbell

(10) Patent No.: US 7,699,576 B2
(45) Date of Patent: Apr. 20, 2010

(54) TIRE LIFTING AND MOUNTING TOOL

(76) Inventor: Steve Alan Campbell, 5105 Harvard, Amarillo, TX (US) 79109

( * ) Notice: Subject to any disclaimer, the term of this patent is extended or adjusted under 35 U.S.C. 154(b) by 0 days.

(21) Appl. No.: 11/983,502

(22) Filed: Nov. 13, 2007

(65) Prior Publication Data
US 2009/0123258 A1 May 14, 2009

(51) Int. Cl.
*B60B 29/00* (2006.01)
*B65G 7/00* (2006.01)
(52) U.S. Cl. .................................. 414/428; 414/426
(58) Field of Classification Search ................ 414/428, 414/426
See application file for complete search history.

(56) References Cited
U.S. PATENT DOCUMENTS 1,892,979 A * 1/1933 Clark ........................ 414/428
2,525,437 A * 10/1950 Winzler et al. ............ 414/427
2,613,084 A * 10/1952 Burch ........................ 414/428
5,702,226 A * 12/1997 Pickle ........................ 414/426

* cited by examiner

Primary Examiner—Saúl J Rodríguez
Assistant Examiner—Jonathan D Snelting
(74) Attorney, Agent, or Firm—Delphine James

(57) ABSTRACT

The present invention, a tire mounting device, is a lifting and transporting device for the facilitating the removing and replacing of a tire. The tire mounting device comprises a cross assembly, handle assembly, left fork assembly, and right fork assembly. The handle assembly is perpendicularly rigidly attached to the cross assembly. The left fork assembly and right fork assembly are rigidly attached to opposing ends of cross assembly which extends horizontally. An obtuse angle is disposed in an intermediate position with each fork assembly. Tire supports the underside of each fork assembly to allow for the transporting the tire upon the tire mounting device.

4 Claims, 3 Drawing Sheets

( 100, 70 )

65      66

TIRE LIFTING AND MOUNTING TOOL

BACKGROUND

The present invention relates to a tire lifting tools. More particularly, the present invention relates to a tire mounting device which is capable of lifting a wheel and allowing the wheel to be rotated to align the studs with the wheel for mounting on a vehicle.

The prior art describes several patents capable of transporting a tire from one location to another. For example; U.S. Pat. No. 5,702,226 relates to a tire dolly capable relocating a tire from one location to another. However, the present invention provides a unique tire mounting device design.

SUMMARY

One objective of the present invention is to provide a safe and efficient method of lifting and mounting a tire with less strain when repairing or removing a new or repaired tire on a vehicle.

The present invention, a tire mounting device, is a lifting and transporting device for the facilitating the replacement or removal of a tire. The tire mounting device comprises a cross assembly, handle assembly, left fork assembly, and right fork assembly. The handle assembly is perpendicularly rigidly attached to the cross assembly. The left fork assembly and right fork assembly are rigidly attached to opposing ends of cross assembly which extends horizontally. An obtuse angle is disposed in an intermediate position with each fork assembly. A tire is disposed below the obtuse angle and supports the underside of each fork assembly to allow for the lifting of tire upon the tire mounting device. A bar support is interiorly and pivotally mounted to the lower end of each fork assembly to support a wheel. Each bar support pivots and rotates to allow a wheel to be rotated in alignment with the studs so that the wheel can be mounted upon the hub of a vehicle.

DESCRIPTION OF THE PREFERRED EMBODIMENT

Figure 1:
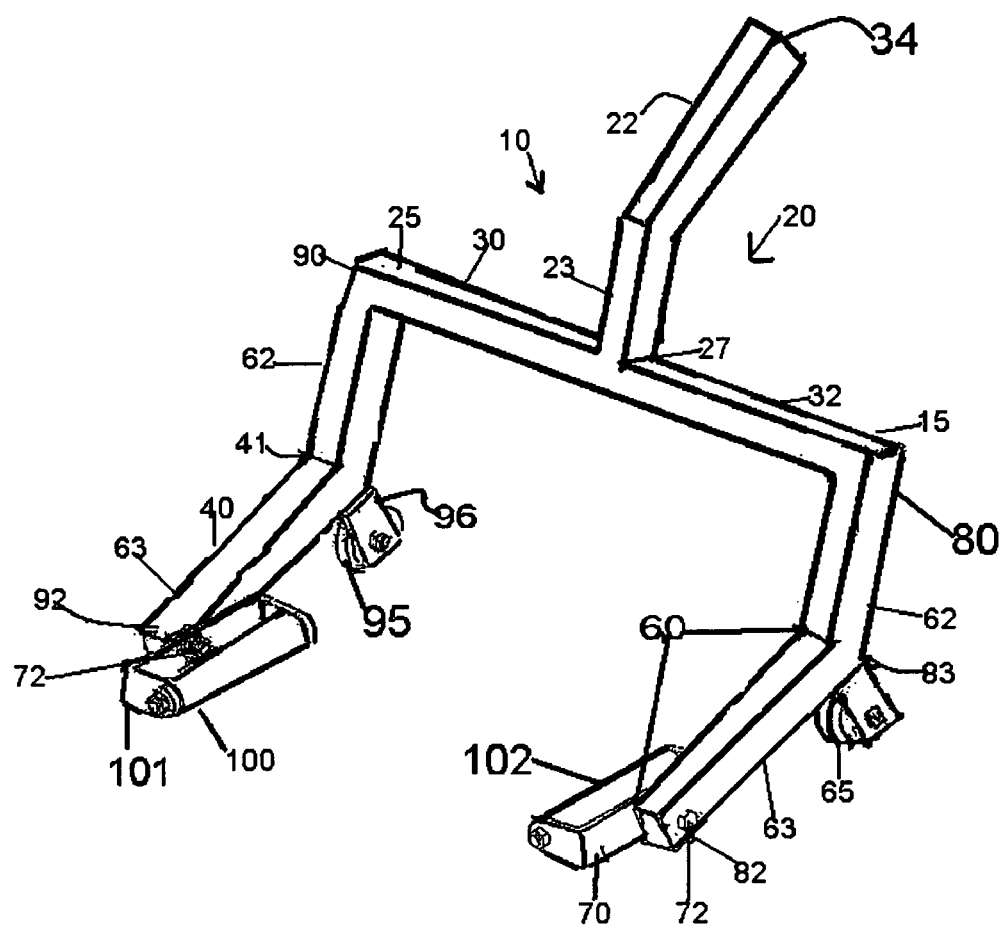
FIG. 1 is a perspective view of the present invention, tire mounting device.

Referring to FIG. 1 there is shown a perspective view of the present invention. As shown, tire mounting device 10 further comprises a cross assembly 15, handle assembly 20, left fork assembly 40, and right fork assembly 60.

Cross assembly 15 further includes an axle member extending in a horizontal relation to handle assembly 20. Axle member 25 is defined by a left end 30 and an opposing right end 32. Left fork assembly 40 is attached to the left end 30 of axle member 25, and right fork assembly 60 is attached to the opposing right end 32 of axle member 25.

Right fork assembly 60 is defined by an upper end 80 and a lower end 82. Upper end 80 is attached to the right end 32 of axle member 25. Disposed at an intermediate position in right fork assembly 60 is obtuse angle 41 facing upward with right apex point 83 facing downward toward ground level. Obtuse angle 41 segments right fork assembly 60 into upper shaft portion 62 and lower shaft portion 63. Upper shaft portion 62 extends substantially linearly upward to the right end 32 of axle member and rigidly attaches thereto.

Figure 5:
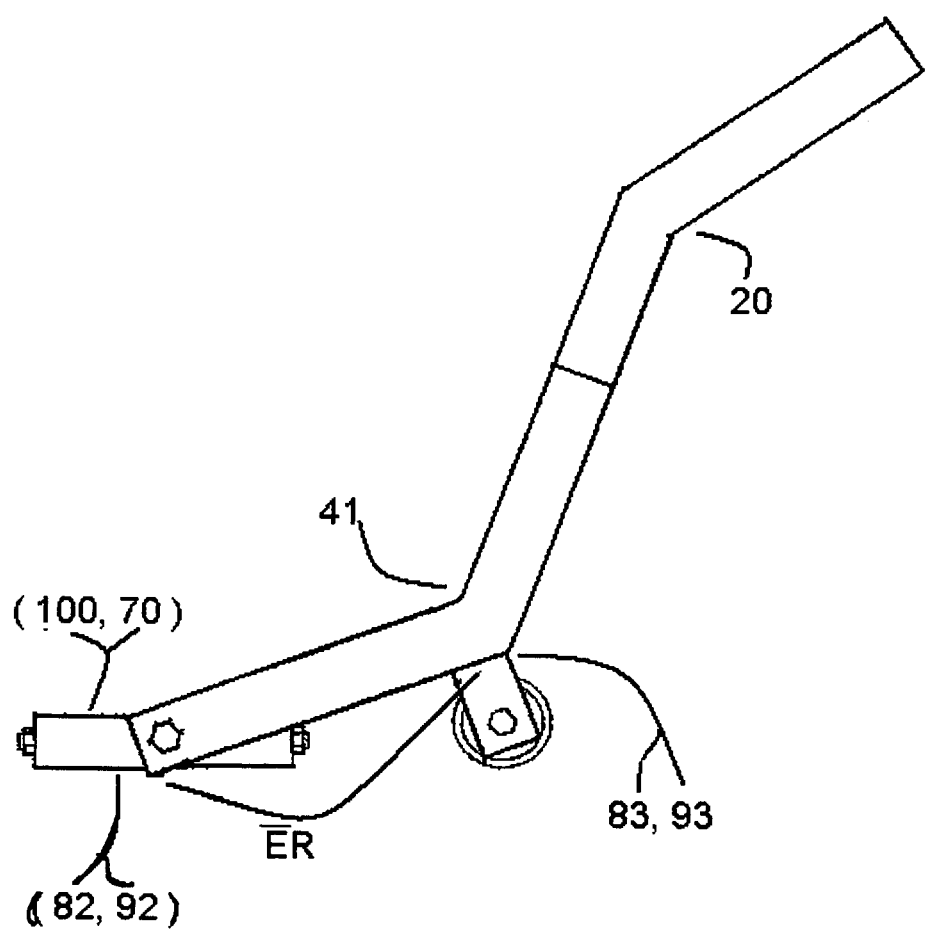
FIG. 5 is a side view of the tire mounting device.

Referring to FIG. 5, there is shown a side view of both right fork 60, and left fork assembly 40. As shown in FIG. 5, lower shaft portion 63 slopes at a predetermined elevation level designated as ER from right apex point 83 downward to ground level terminating in lower end 82 of right fork assembly 60.

Figure 3:
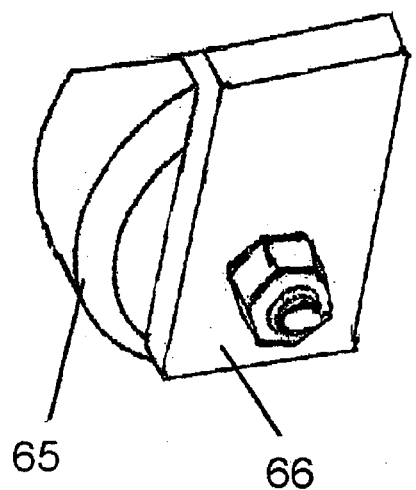
FIG. 3 is an exploded view of right and left tire to support the tire mounting device.
Figure 4:
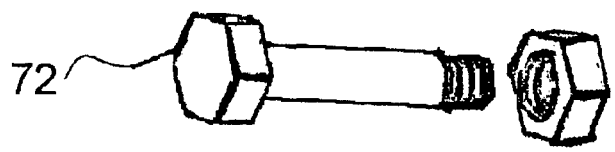
FIG. 4 is an exploded view of the bolt that pivotally secure the right and left bar to the fork assembly.

As depicted FIG. 3, right axle bracket 66 is adapted to mount right wheel member 65 to the bottom surface area of lower shaft portion 63 near right apex point 83. Right axle bracket 66 extends downward from the predetermined elevation level ER to near ground level allowing right wheel member 65 to rotate during transport of tire. Right axle 66 extends 5.1 centimeters forcing lower portion to slope downward. Right axle bracket 66 further comprises two parallel bracket members with right wheel member 65 securely and pivotally bolted therebetween.

Right bar support member 70 is pivotally and interiorly mounted to the lower end 82 of right fork assembly 60 through bolt member 72. As shown in the preferred embodiment, right bar support member 70 is a rectangular shape polyhedron pivotally bolted to the lower end 82 of right fork assembly 60. Right bar support member 70 pivots as well as rotates to allow the user to load a tire onto the tire mounting device assembly 10.

Left fork assembly 40 is defined by an upper end 90 and a lower end 92. Upper end 90 is attached to the left end 30 of axle member 25. Disposed at an intermediate position in left fork assembly 40 is obtuse angle 41 facing upward with left apex point 93 facing downward toward ground level. Obtuse angle 41 segments left fork assembly 40 into upper shaft portion 62 and lower shaft portion 63. Upper shaft portion 62 extends substantially linearly upward to the left end 30 of axle member 25 and rigidly attaches thereto. As shown, lower shaft portion 63 slopes at a predetermined elevation level designated as ER from left apex point 93 downward to ground level terminating in lower end 92 of left fork assembly 40.

As depicted in FIG. 3, left axle bracket 96 is adapted to mount left wheel member 95 to the bottom surface area of lower shaft portion 63 near left apex point 93. Left axle bracket 96 extend downward from the predetermined elevation level ER to near ground level securing right allows left wheel member 95 to rotate during transport of a tire. Left axle 96 extends at least 2 inches forcing lower portion to slope downward. Left axle bracket 96 further comprises two parallel bracket members with left wheel member 95 securely and pivotally bolted therebetween.

Left bar support member 100 is pivotally and interiorly mounted to the lower end 92 of left fork assembly 60. As shown in the preferred embodiment, Left bar support member 100 is a rectangular shape polyhedron pivotally bolted to the lower end 92 of left fork assembly 40. Additionally left bar support member 100 can rotate 360 degrees for lifting the tire upon the mounting device.

The obtuse angle offset allows for greater stability during transport of the load. The right bar support member 70 and the left bar support member 100 pivot for lifting the tire.

Handle assembly 20 is further defined by an upper end 22 and a lower end 23. The lower end 23 of handle assembly 20 is rigidly and perpendicularly mounted upon and substantially near the center 27 of axle member 25 of cross assembly 15. As shown, obtuse angle 31, formed near the center of handle assembly 20, faces downward and segments handle assembly 20 into upper shaft portion 32 and lower shaft portion 33. Upper shaft portion 32 is relatively longer than lower shaft portion 33. Upper shaft portion 32 can be extended as long as required. For ease of handling, padded grip 34 can be attached to the upper end 22.

Figure 2:
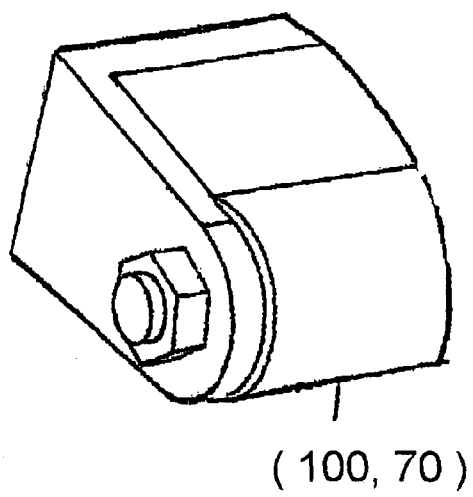
FIG. 2 is an exploded view of the right and left bar to support the tire.

As depicted in the FIG. 1 and 2, the lower shaft portion 63 is relatively longer than upper shaft portion 62 for both right fork assembly 60 and left fork assembly 40. This configuration allows for supporting the tire upon the lifting and mounting device 10. In the preferred embodiment the length of the lower shaft portion 63 is approximately at least 16.8 centimeters.

Right bar support member 70 and left bar support member 100 further include U-shaped brace 101 which receives a cylindrical roller member 102 therebetween and is affixed thereto. The U-shaped brace 101 is pivotally attached to the lower end of the right fork assembly 60 and the left fork assembly 40. In the preferred embodiment the length of the each bar support member (70, 100) is approximately at least 5and 1.6 centimeters. Each cylindrical roller member 102 can support a tire (not shown) thereon and rotates allowing the tire to be rotated in alignment with the studs so that the wheel can be mounted upon the hub of a vehicle.

In alternative embodiments, the tire mounting device can be adapted to disassemble for storage purposes. In one embodiment, the handle assembly 20 (illustrated in FIG. 1) can be collapsible or removable from the cross assembly 15 for easy storage. In other embodiments the right fork assembly 60 and left fork assembly 40 can be adapted to be removable from the ends of the cross assembly 15.

While the invention has been illustrated and described as embodied in a tire mounting device it is not intended to be limited to the details shown since it will be understood that various omissions, modifications, can be made by those skilled in the art without departing in any way from the spirit of the inventions

What is claimed is:

1. A tire mounting device for mounting and lifting a wheel upon a hub of a vehicle, the tire mounting device comprising:
    a cross assembly having an elongated axle member defined by a left end and
    an opposing right end;
    a handle assembly further comprising:
        a shaft member further defined by an upper end and a lower end;
        the lower end of the shaft member being rigidly and perpendicularly mounted upon and substantially near the center of the axle member;
        an obtuse angle being formed near the center of the shaft member, the obtuse angle facing downward toward ground level and segmenting the shaft member into an upper shaft portion and a lower shaft portion;
        the upper shaft portion being relatively longer than the lower shaft portion;
        the axle member extending in a horizontal relation to the shaft member;
    a right fork assembly further comprising:
        a shaft member defined by an upper end and a lower end;
        the upper end of the shaft member being attached to the right end of the axle member;
        an obtuse angle disposed at an intermediate position in the shaft member, the obtuse angle having a right apex point facing downward toward ground level;
        the obtuse angle segmenting the shaft member into an upper shaft portion and a lower shaft portion;
        the upper shaft portion extending substantially linearly upward to the right end of the axle member and being rigidly attached thereto;
        a right bar support member being pivotally and interiorly mounted a predetermined distance in front of the lower end of the shaft member wherein the right bar support member pivots perpendicular to the ground to allow for the receiving of a tire onto the tire mounting device for transporting;
        a right axle bracket being adapted to mount a right wheel member to a bottom surface area of lower shaft portion near the right apex point;
        the right axle bracket extending downward from a predetermined elevation level to near ground level whereby the right wheel member rotates during the transporting of a tire upon the tire mounting device,
    a left fork assembly further comprising
        a shaft member defined by an upper end and a lower end;
        the upper end of the shaft member being attached to the left end of the axle member;
        an obtuse angle disposed at an intermediate position in the shaft member, the obtuse angle having a left apex point facing downward toward ground level;
        the obtuse angle segmenting the shaft member into an upper shaft portion and a lower shaft portion;
        the upper shaft portion extending substantially linearly upward to the left end of the axle member and being rigidly attached thereto;
        a left bar support member being pivotally and interiorly mounted a predetermined distance in front of the lower end of the shaft member wherein the left bar support member pivots perpendicular to the ground to allow for the receiving of a load onto the tire mounting device for transporting;
        a left axle bracket being adapted to mount a left wheel member to a bottom surface area of lower shaft portion near the left apex point;
        the left axle bracket extending downward from a predetermined elevation level to near ground level whereby the left wheel member rotates during the lifting of the wheel upon the tire mounting device;
        and the obtuse angle within the left fork assembly and the right fork assembly providing stability for lifting the wheel upon the tire mounting device; each bar support pivots and rotates to allow a wheel to be rotated in alignment with the studs so that the wheel can be mounted upon the hub of a vehicle.

2. The tire mounting device of claim 1 wherein the right and left bar support member further comprises:
    a U-shaped brace which receives a cylindrical roller member there between and is rotatably mounted thereto; and
    the U-shaped brace being pivotally attached to the lower end of the shaft member of the right fork assembly and the lower end of the shaft member of the left fork assembly wherein the wheel supported by the left bar support member and the right bar support member can be rotated and pivoted in alignment with a hub of the vehicle.

3. The tire mounting device of claim 1 wherein the lower shaft portion of the shaft member of both the right fork assembly and left fork assembly is relatively longer than upper shaft portion of the shaft member for both right fork assembly and left fork assembly.

4. The tire mounting device of claim 1 further comprises a means for assembling and disassembling the tire mounting device for storage.

* * * * *